United States Patent [19]
Blakley, III et al.

[11] Patent Number: 5,677,952
[45] Date of Patent: Oct. 14, 1997

[54] METHOD TO PROTECT INFORMATION ON A COMPUTER STORAGE DEVICE

[75] Inventors: George R. Blakley, III, Austin, Tex.; Phillip W. Rogaway, Davis, Calif.

[73] Assignee: International Business Machines Corporation, Austin, Tex.

[21] Appl. No.: 349,778

[22] Filed: Dec. 6, 1994

Related U.S. Application Data

[63] Continuation-in-part of Ser. No. 163,054, Dec. 6, 1993, Pat. No. 5,454,039.
[51] Int. Cl.⁶ .................................................. H04L 9/00
[52] U.S. Cl. .................. 380/4; 380/9; 380/28; 380/46; 380/49
[58] Field of Search .................. 380/4, 9, 23, 25, 380/46, 49, 50, 28, 30, 37

[56] References Cited

U.S. PATENT DOCUMENTS

| | | |
|---|---|---|
| 4,074,066 | 2/1978 | Ehrsam et al. |
| 4,238,854 | 12/1980 | Ehrsam et al. |
| 4,319,079 | 3/1982 | Best |
| 4,593,353 | 6/1986 | Pickholtz |
| 4,734,796 | 3/1988 | Grynberg et al. |
| 4,888,798 | 12/1989 | Earnest |
| 4,907,274 | 3/1990 | Nomura et al. ........... 380/30 |
| 5,003,597 | 3/1991 | Merkle ..................... 380/37 |
| 5,212,729 | 5/1993 | Schafer |
| 5,239,581 | 8/1993 | Hane |
| 5,454,039 | 9/1995 | Coppersmith et al. ..... 380/28 |

*Primary Examiner*—Bernarr E. Gregory
*Attorney, Agent, or Firm*—Jeffrey S. LaBaw; David H. Judson

[57] ABSTRACT

A method, using a secret key, to protect information in a storage disk of a computer, where the secret key is derived from a password entered into the computer by an authorized user. The method begins by applying a length-increasing pseudorandom function to the secret key and an index to generate a pseudorandom bit string having a length that is a function of the size of a sector of the storage disk. The sector is associated or otherwise identified by the index used by the pseudorandom function to generate the pseudorandom bit string. The pseudorandom bit string is then used to encrypt and decrypt data accesses to and from the sector.

20 Claims, 3 Drawing Sheets

METHOD TO PROTECT INFORMATION ON A COMPUTER STORAGE DEVICE

This application is a continuation-in-part of prior application Ser. No. 08/163,054, filed Dec. 6, 1993, and assigned to the assignee of this application, now U.S. Pat. No. 5,454,039.

TECHNICAL FIELD

The present invention relates generally to computer data security and more particularly to a method to protect against unauthorized disclosure of information stored on a mass storage device of a computer.

BACKGROUND OF THE INVENTION

The shrinking of computing resources has led to a new and dangerous mass security threat. Information stored in a computer's mass storage device (e.g., a hard disk) can be stolen by theft of the computer itself. The theft of smaller computers such as "portables" is a particularly urgent problem that has not been adequately addressed. Whether the portable computer is stolen for the sensitive data stored therein or for the hardware is often unclear from the circumstances of the theft itself; typically, however, the owner must assume that the data will be compromised.

There are other known threats to sensitive information stored in a computer. Under many operating systems there is no access control or user authentication. For example, under the DOS or OS/2 operating systems as well as With other machines with access control, a so-called "lunchtime" attack can be quite effective. In this scenario, the adversary sneaks into an insecure or unattended area and copies information off the computer's hard disk. The owner, of course, may never know that the information has been stolen.

There is therefore a long felt need in the computer industry for methods to protect information on a computer storage device against unauthorized disclosure when the computer is stolen or temporarily commandeered by unauthorized individuals.

BRIEF SUMMARY OF THE INVENTION

It is a principal object of the invention to protect the confidentiality of information stored on a storage device of a computer, even if the computer is stolen or otherwise accessed without the owner's consent or knowledge.

It is a further object of the invention to allow any computer (including, without limitation, personal computers, portable computers, pen-based computers and handheld personal data assistants or "PDA's") to secure information stored therein such that there is little or no user visibility of the security, no special security features are required of the underlying hardware or operating system, and there is little performance impact on the operation of the device.

It is still a further object of the invention to secure and protect information on a storage device of a computer using a cryptographic transformation that operates efficiently in software and that is optimized to known high speed microprocessors. The cryptographic transformation is used to encrypt and decrypt data accesses to and from the computer's storage device.

It is another object of the invention to describe a method for securing information on a portable computer that is shared by a number of authorized users, each obtaining access with his own password. Each authorized user of the computer may change his or her password yet still access the computer's storage device in a secure manner.

It is yet a further object of the invention to describe a novel computer that incorporates the techniques for securing sensitive information stored therein.

These and other objects of the invention are provided in a method, using a secret key, to protect information in a storage disk of a computer, where the secret key is derived from a password entered into the computer by an authorized user. The method begins by applying a length-increasing pseudorandom function to the secret key and an index to generate a pseudorandom bit string having a length that is the size of a sector of the storage disk. The sector is associated or otherwise identified by the index used by the pseudorandom function to generate the pseudorandom bit string. The pseudorandom bit string is then used to encrypt and decrypt data accesses to and from the sector. Thus, all sensitive information is stored on the storage device in ciphertext. The ciphertext is decrypted by the pseudorandom bit string when the disk is read. Information to be stored in a sector is encrypted by the pseudorandom string before it is written to the disk.

Preferably, the secret key is only maintained in the computer's volatile memory to thereby enable the authorized user to encrypt and decrypt data accesses from the sector during authorized use of the computer. However, when the particular computing session is ended (e.g., when the authorized user turns the computer off or logs off) or interrupted (e.g., when the authorized user locks up the computer or ceases to interact with the computer for a predetermined timeout period), the secret key is erased from the computer's volatile memory to prevent unauthorized access to and disclosure of information in the sector.

In one preferred embodiment, the secret key is preprocessed by transforming it into one or more tables of pseudorandom numbers. Preprocessing the secret key in this manner facilitates the generation of the pseudorandom bit string by the pseudorandom function once the particular index (i.e., the disk sector identification) is identified. The tables of pseudorandom numbers provide an efficient representation of the secret key to decrease the time necessary to generate the particular pseudorandom bit string associated with the sector.

According to another feature of the invention, a computer having a storage device is provided with a routine for processing a password to generate a secret key. A pseudorandom function uses the secret key and an index to generate a pseudorandom bit string whose length is a function of the size of a particular disk sector identified by the index. Data accesses to and from the disk sector and encrypted and decrypted using the bit string.

The preferred method may be implemented on a program storage device (e.g., a floppy diskette) that is readable by a processor and that tangibly embodies a program of instructions executable by the processor to perform the method.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

According to the present invention, a software product is provided that works under any operating system (including, without limitation, DOS, OS/2, and AIX) to protect all confidential information on a computer disk or other storage media during those periods in which the machine is not in use. The invention protects against thieves, lunchtime attacks and other invasions of privacy. The invention is useful on so-called "portables" (i.e., laptop, notebook and subnotebook computers), desktop machines (i.e., personal computers or workstations), pen-based machines, other handheld computers including personal data assistants ("PDA's"), smartcards and the like. As used herein, "computer" in intended to have the broadest possible interpretation.

According to the invention, all sensitive information on the computer's storage device is stored in ciphertext using a secret key such that if the storage device or the computer itself is stolen or improperly accessed, the thief cannot make use of the information. The information obtained from each read of the storage device is decrypted, and the information obtained from each write is encrypted. Preferably, the requisite secret key is not present on the storage device; rather, it resides in memory when the machine is in use, and it resides nowhere in the computing system when the machine is not in use.

More specifically, securing the computer's sensitive information and data is achieved by using a cryptographic object, called a "length-increasing pseudorandom function," which is a function of the secret key and an index that determines where in the storage device the particular data is stored. The result of that evaluation is a pseudorandom bit string that will have a length equal to the area of the storage device in which the data will be stored. If the storage device is a hard disk drive, the area is a "sector." Data to be stored in the sector is then encrypted with the pseudorandom bit string (typically by XORing the bit string with the plaintext) to derive the ciphertext, which is then stored.

Figure 1:
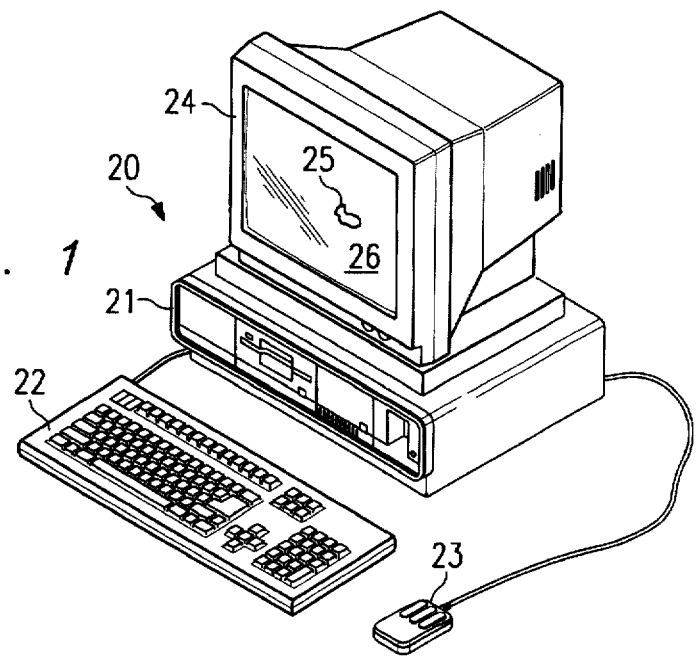
FIG. 1 illustrates a computer comprising a system unit, a keyboard, a mouse and a display, for use in implementing the method to protect information according to the present invention.

By way of brief background, a computer for use in supporting the invention tool is shown in FIG. 1. The computer 20 comprises a system unit 21, a keyboard 22, a mouse 23 and a display 24. The screen 26 of display device 24 is used to present a graphical user interface (GUI). The graphical user interface supported by the operating system allows the user to use a point and shoot method of input, i.e., by moving the mouse pointer 25 to an icon representing a data object at a particular location on the screen 26 and pressing on the mouse buttons to perform a user command or selection.

Figure 2:
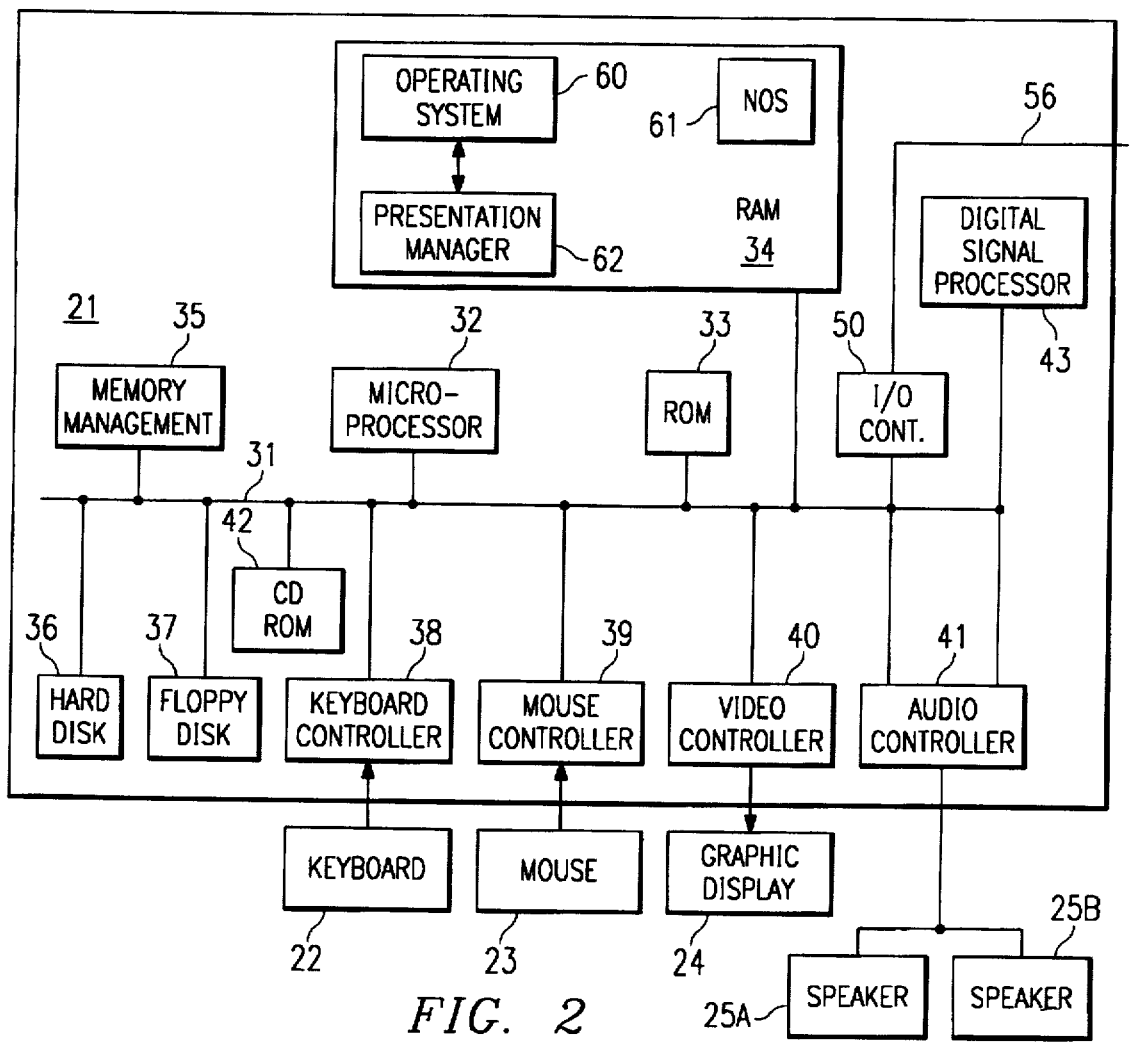
FIG. 2 is an architectural block diagram of the computer illustrated in FIG. 1.

FIG. 2 shows a block diagram of the components of the personal computer shown in FIG. 1. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM PS/2 series of computers is one of the Intel family of microprocessors including the 386 or 486 microprocessors. Other microprocessors included, but not limited to, Motorola's family of microprocessors such as the 68000, 68020 or the 68030 microprocessors and various RISC microprocessors such as the PowerPC™ microprocessor manufactured by IBM, and others made by Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over the local area network 56 to other similarly configured data processing systems.

One of the preferred implementations of the present invention is as a set of instructions in a code module resident in the random access memory 34. Until required by the computer system, the set of instructions may be stored in another computer memory, for example, in the hard disk drive 36, or in a removable memory such as an optical disk for eventual use in the CD ROM 42 or a in a floppy disk for eventual use in the floppy disk drive 37. As shown in FIG. 2, the operating system 60 and the presentation manager 62 are resident in RAM 34.

According to the invention, the contents of the data storage device (such as hard disk drive 36) are protected from unauthorized disclosure of its information through the use of a pseudorandom function keyed using a user-derived secret and evaluated at the position of a data block within the data storage device in order to determine a mask which is XORed or otherwise combined with the data stored at that location. Generally, the invention envisions the use of a length-preserving cipher where the ciphertext depends not only on the plaintext (i.e., the data to be secured) and the key but also on the plaintext's position or index; namely (plaintext, $f_{secretkey}$ (index)). Thus, for example, one might use the cipher block chaining of a block cipher, with the initialization vector thereof specifying the sector position. A stream cipher of similar structure and function is thus useful in the present invention.

In one embodiment, the invention is a device driver that transparently encrypts and decrypts all accesses to and from the disk 36. In this application, the secret key is a bit string that is derived from a password $P_u$ that a user u enters when he or she turns his machine on. As an example, one might select $a=SHA(p_u) \oplus K_u$, with $K_u$ being a 160-bit string associated to user u and stored on the machine's disk. "SHA" refers to the Secure Hash Algorithm described in National Institute of Standards, "Secure Hash Standard," Federal Information Processing Standards Publication 180, which is incorporated herein by reference. When the operating system tries to read the i-th sector from the hard disk, the data there (i.e., a string x) is read and then decrypted by XOR-ing it with a length-increasing pseudorandom function $f_a$ evaluated at "i" (i.e., the sector number). As many bits of the pseudorandom function are used as a sector is long. Similarly, when the operating system tries to write the i-th sector, the data to be written is first encrypted by XOR-ing with $f_a(i)$. In the event that there is more than one disk whose contents are to be encrypted, indices are selected for each disk such that no two sectors receive the same index.

Figure 3:
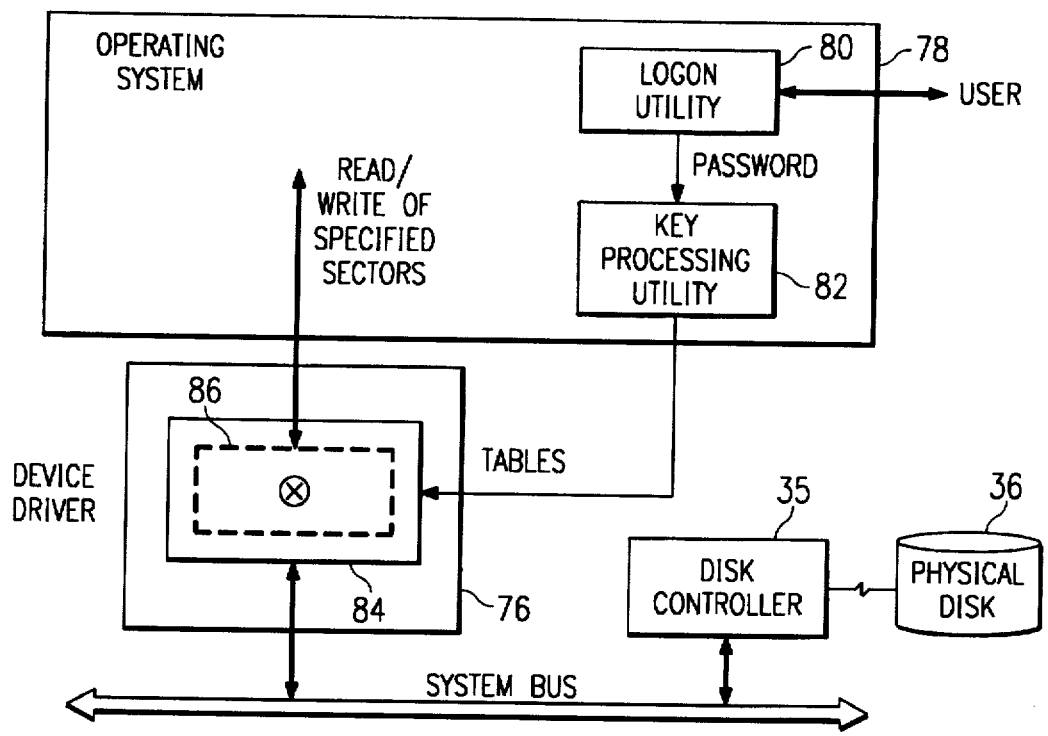
FIG. 3 illustrates a portion of the computer of FIG. 1 showing a length-increasing pseudorandom function supported in the device driver to facilitate disk encryption.

FIG. 3 illustrates a portion of the computer of FIG. 1 showing the pseudorandom function supported in a device driver to facilitate such disk encryption. As used herein, the term "device driver" also includes terminate and stay-resident programs. In this example, the computer supports the device driver 76 that intercepts read or write calls directed to a mass storage device, in this case the hard disk 36 of the computer of FIG. 2. The read/write calls are communicated to the device driver 76 from the operating system 78. The operating system supports a login utility 80 that receives the password $P_u$ that the user enters when he turns the computer on. The login utility hands off the password to the key processing utility 82 that generates an efficient representation of the secret key to enable computationally-fast generation of a pseudorandom bit string that is used to secure the information intended for or retrieved from the sector. In one embodiment, the efficient representation is one or more tables of pseudorandom numbers that are then are supplied to the pseudorandom function 84. Function 84 then encrypts the disk data via the encryption function 86, usually an XOR.

The particular details of the preferred embodiment can now be described in greater detail. When the user installs the product, it queries him for a password $P_u$ and possibly a user name and other usercheck data. Information dependent on the user password is then combined with (non-secret) information (e.g., a mask associated to the user and an instance identification for the product) to determine a secret key, a, for the user. More particularly, the mask may depend on a value identification (ID) stored on the machine's disk (in the clear), where the ID is unique to each machine and may be a random number or a device serial number. The mask may depend on information stored (in the clear) on the disk and that is associated to the particular user. Or the mask may depend on user-associated check information used in such a way that the mask will evaluate to "invalid" if the entered password does not recover the correct key. The secret key can also be generated using a slow-to-compute function. Such processing insures that an attacker cannot assemble a generally-useful dictionary of secret keys corresponding to commonly-selected passwords.

The secret key a is processed by the computing system to convert it into an efficient representation of a cipher specialized to a, namely $f_a$. The cipher $f_a$ is a "length-increasing pseudorandom function" that takes a relatively short index i and maps it into a long sequence of bytes, as many bytes as there are bytes in one sector of the disk 36. A one-way function of the secret key a is installed on the mass storage device to allow the key processing unit to distinguish correct and incorrect passwords. However, preferably the password itself is not saved after installation.

Each sector in the range over which the user wishes to have information information kept private is then subjected to the following processing. When the string x at position i of the disk is read, the value $f_a(i)$ is computed by the computing system. These steps may be carried out concurrently. A value y is computed by XORing or otherwise combining x and $f_a(i)$. The value y replaces the previous value x for the contents of the sector. This completes the installation of the program.

Later, when the user performs a machine logon or otherwise initiates a session with the machine, the following processing takes place. The authorized user first enters a password, and possibly a user name and other data. Again, this information, possibly combined with other (non-secret) information stored in the computing system, determines the secret key. The secret key is then subjected to processing in the computing system to convert it into an efficient representation of a cipher specialized to a, namely $f_a$. The password is verified by checking a one-way function of "a" against information stored in the computing device. If the password is incorrect, logon is denied; otherwise, logon is accepted. This completes the logon operation.

As noted above, at some time after logon and in response to a read command, the operating system will attempt to read the i-th sector from the disk, where information has been stored in encrypted form. When this occurs, the software computes $f_a(i)$, which can be done quickly because the secret key has already been preprocessed into an efficient representation of $f_a$. The underlying hardware then retrieves the contents of the i-sector of the disk, namely "ciphertext" y. This operation may be concurrent with the $f_a(i)$ computation. The value y returned as a result of the read is XORed with $f_a(i)$ to determine the "plaintext" x. Or, the ciphertext and $f_a(i)$ may be combined in some other way to determine x.

At some point in time after logon and in response to a write command, the operating system will attempt to write the contents of the i-th sector from the disk, where information for this sector is to be stored in encrypted form. When this occurs, the software computes $f_a(i)$, and then computes the ciphertext y which is the XOR of x and $f_a(i)$. Or these strings are otherwise combined to determine the ciphertext. The computing system then writes the string y to the position at i.

The efficient representation of $f_a$, the function that produces pseudorandom bit string for each sector index, and any other information (e.g., the secret key) useful in encrypting and decrypting disk accesses, is preferably stored in volatile memory when the machine is in use under the control of an authorized user. When the authorized user logs off, powers off, locks the computer, or when a predetermined timeout occurs (e.g., a time period during which no user interaction with the machine has occurred), the efficient representation of $f_a$ and such other information, is erased.

In a preferred embodiment, the inventive scheme is implemented as low-level software and, as noted above, may be a device driver or terminate-stay-resident program. On a machine like an IBM PS/1 or PS/2, which use the BIOS (Basic Input Output System) for low-level disk operations, the software can be latched into the interrupt chain and associated with the interrupts that are used to gain read and write access to the hard disk.

If desired, the encrypting software is located in a device driver and encryption occurs on specified partitions; elements of the operating system that load before the device driver reside in a non-encrypted partition. In another embodiment, the boot sector of the machine is modified and all sectors, except the boot sector and the sectors containing the algorithm itself, are encrypted.

Preferably, it is desired that an authorized user have the ability to change his or her password, but that the high-overhead operation of encrypting the entire disk should be performed only at install time and not during password change. This is achieved as follows. During installation as described above, a strong password or a sequence of unpredictable bits is determined. This password or these bits determine the secret key a that is used to encrypt the disk according to the function $f_a$.

When the user u types a password which leads to key $a_u$, the record (u, $a_u \oplus a$) is stored on the disk. When the user u presents his password at some later time, $a_u$ is determined and XORed with the value $a_u \oplus a$ stored on disk to recover a, which is then used to encrypt and decrypt the disk. If the user wishes to change his password from $p_u$ to $p_u'$, where $p_u$ maps to key $a_u$ and $p_u'$ maps to key $a_u'$, all that needs to be done is to replace the record (u, $a_u \oplus a$) by (u, ($a_u \oplus a)\oplus(a_u \oplus a_u')$). Thereafter, the routine recovers a from $a_u'$ and (u, $a_u'\oplus a$) in the same way as it recovers a from $a_u$ and (u, $a_u \oplus a$).

Similar processing can be used to allow multiple users to share the computer, and each user can separately change his or her password. When multiple users share the computer, it is not always necessary to have a user specify his identity u at logon time. Rather, at logon, each record (u, $a_u \oplus a$) can be tried and, if any record yields a key a that recovers the disk contents, the user is allowed on end the function $f_a$ is appropriately constructed.

Nontrivial password processing (the function from the password $p_u$ that u types to $a_u$) is useful in protecting the encryption against brute force attacks, e.g., an attacker who steals the computer and then has the time to test millions of passwords. One useful approach to frustrate such an attack is to apply to the password $p_u$ a slow-to-compute one-way function. The resulting data string is then used to create the secret key. Although such an approach does not materially impact operating efficiency from the user's viewpoint (because the password is processed at logon, which is expected to take several seconds), it presents a significant barrier to a thief who (without knowledge of an authorized user's password) must test millions of potential passwords in order to find one that works. If each test password must be run through a slow-to-compute function, the number of candidate passwords that the thief can try is significantly decreased.

Additional security may be provided by allowing an artifact to be employed in the scheme so that a user must know a password and also possess a token in order to obtain access to the computer. A simple authentication artifact that is useful for the purpose is a diskette itself, with the diskette for user u containing a secret $k_u$. The user also remembers another secret, $K_u$. These two secrets are combined by any of several means (e.g., just XORing them) to determine the key which is used as above.

The pseudorandom function used herein is optimized to perform efficiently in software and is preferably implemented on a 32-bit (or higher order) processor of conventional design. Such processors, e.g., include the Intel 386™, Intel 486™ and the Pentium™ Processor, as well as 32-bit Reduced Instruction Set Computer (RISC) processors like the Power PC™. While these execution vehicles are preferred, the length-increasing pseduorandom function is appropriate to any general purpose 32-bit processor.

As noted above, the pseudorandom function is a cryptographic "object" that preferably maps a relatively short (e.g., 32 bits) index "i" and a secret key a to an pseudorandom bit sequence $f_a(i)$. For f to be called a pseudorandom function, it must be impossible for the attacker, who does not know "a," to distinguish $f_a(i)$ from a random function of i. To create the "efficient representation" of the secret key, the key is preprocessed into a table of pseudorandom values. The index (i.e., the sector identification) and a set of values from a table is then used to generate initial values for a plurality of registers. Using a predetermined mixing function, the initial values of some of the registers are then modified in part by taking a current value of a register and replacing the current value with a function of the current value and a value retrieved from the table, the latter value being determined by portions of one or more other registers. After modifying the registers in this fashion, their resulting values are masked using other pseudorandom values derived from the tables and a predetermined masking function. The masked register values are then concatenated into the pseudorandom bit string to complete an iteration. Subsequent iterations are performed to grow the pseudorandom bit string to a desired length, in this case, the length of the disk sector.

Figure 4:
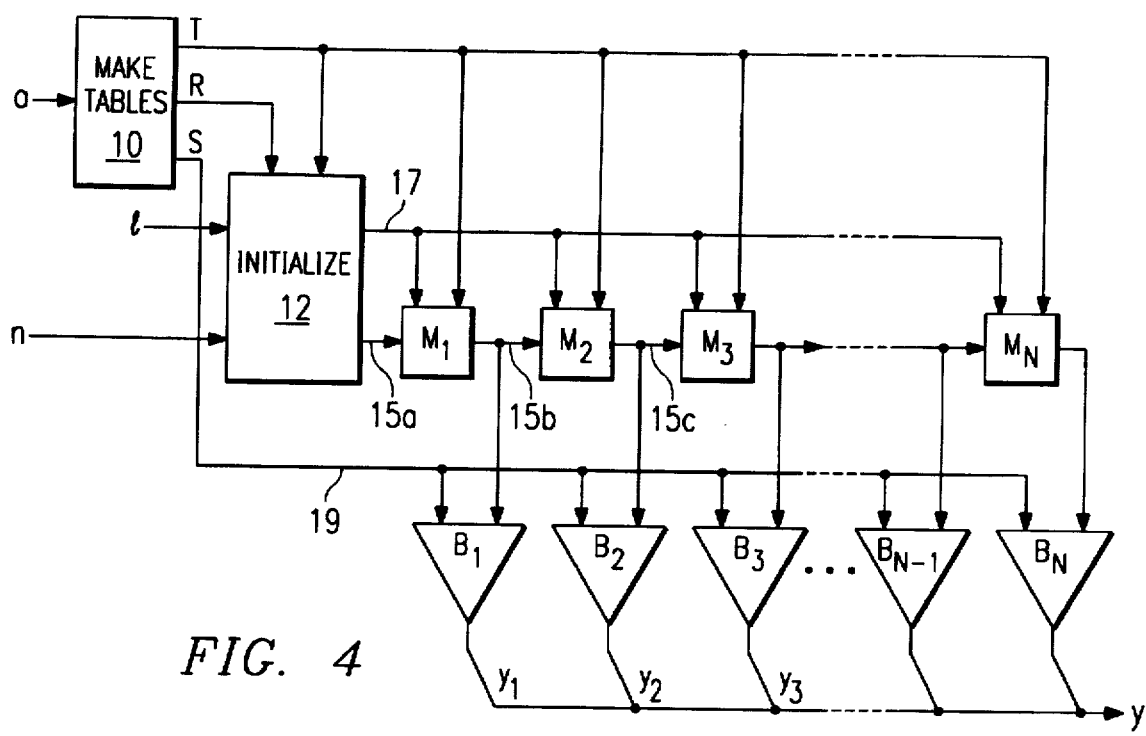
FIG. 4 illustrates a preferred process for generating a pseudorandom bit string.

With particular reference now to FIG. 4, a process flow diagram, as described in Ser. No. 08/163,054, filed Dec. 6, 1993, now U.S. Pat. No. 5,454,039, is shown detailing a method for mapping a 32-bit index "n" to an L-bit string y=$SEAL_a(n)$ under the control of a set of tables T, R and S generated from a key "a." The method begins by preprocessing the key "a" into preferably three (3) tables T, R and S. This step is effected using a Make Table procedure 10 which receives as an input the key "a." In this particular example, the key is a 160-bit string that, in conjunction with a function G described below, is used to define the three tables.

The pseudorandom values in the tables are specified using any one or more algorithms known in the art. The particular algorithm used is not critical and it is envisioned that any secure pseudorandom generator is useful for this purpose. The pseudorandom generator thus may be derived from a secure hash algorithm, a block cipher, a stream cipher, and so on. For example, the algorithm used to generate the tables could be based on DES, MD5, the Secure Hash Algorithm (SHA) or even a combination of any of the above. According to the illustrative embodiment, the function G is described in National Institute of Standards, "Digital Signature Standard," Federal Information Processing Standards Publication XX Draft—February 1993, which is incorporated herein by reference.

With the key "a" being a 160-bit string and i being an integer, $0 \leq i < 2^{32}$, $G_a(i)$ is a 160-bit value. To construct the tables, G is re-indexed by the Make Table procedure 10 to construct a function whose images are 32-bit words instead of 160-bit ones. The function $\Gamma$ is defined by $\Gamma_a(i) = H^i_{i \bmod 5}$ where $H^i_0 H^i_1 H^i_2 H^i_3 H^i_4 = G_a(\lfloor i/5 \rfloor)$. Thus a table of $\Gamma$-values is a table for G-values read left-to-right, top-to-bottom. The Make Tables procedure 10 then preferably defines the tables as follows:

| | |
|---|---|
| T[i] = $\Gamma_a(i)$ | for all $0 \leq i < 512$; |
| S[j] = $\Gamma_a(0 \times 1000 + j)$ | for all $0 \leq j < 256$; and |
| R[k] = $\Gamma_a(0 \times 2000 + k)$ | for all $0 \leq k < 4\lceil(L-1)/8192\rceil$. |

Thus table T has 512 word entries, with each entry being 32-bits in length. The entries of tables S and R are also 32-bit words. Table S has 256 entries and table R has a variable length.

Referring back to FIG. 4, the tables T and R are used by an Initialize procedure 12, which also receives as inputs the index "n" and a length control variable "1". The variable "1" is initially set to "0" and its upper limit will depend on the ultimate desired length of the output stream. The Initialize procedure 12 generates a set of initial values for registers (A, B, C, D, $n_1$, $n_2$, $n_3$, $n_4$). The first group of registers (A, B, C, D) have values that will be modified during a particular "iteration" of the algorithm to be described, whereas the second group of registers ($n_1$, $n_2$, $n_3$, $n_4$) have values that remain constant throughout the "iteration". The method further implements a set of mixing functions, $M_1 \ldots M_N$, and a set of masking functions $B_1 \ldots B_N$, with N preferably equal to 64. Each mixing function $M_i$ has a corresponding masking function $B_i$, and an "iteration" generally comprises a pair of such functions. Thus, mixing function $M_1$ and masking function $B_1$ are effected during a first iteration of the method, and so on. The sixty-four (64) iterations together define a "phase" of the algorithm, with each phase initiated by a call to the Initialize process 12. When the particular phase is complete, the value of "1" in incremented.

The initial values of registers (A, B, C, D) of the first group are supplied via line 15a to the first mixing function $M_1$ during the first iteration. Mixing function $M_1$ also receives via line 17 the initial values of the second group of registers ($n_1$, $n_2$, $n_3$, $n_4$). As will be seen, the function $M_1$ comprises a set of modification instructions which serve to randomize the values of the registers (A, B, C, D) to generate a set of "pre-output" values for these registers on line 15b. The corresponding masking function $B_1$ receives these pre-output values as well as a set of values from table S via line 19. The masking function $B_1$ uses the set of values from table S to "mask" the pre-output register values from the corresponding mixing function to generate a data string of pseudorandom bits $y_1$.

In addition to being supplied to the masking function $B_1$, preferably the pre-output values of registers (A, B, C, D) on line 15b are also provided as inputs to the mixing function of the next iteration, in this case $M_2$. The mixing function also receives via line 17 the initial values of the second group of registers ($n_1$, $n_2$, $n_3$, $n_4$). As described above, these values are initialized by the Initialize process 12 and remain constant throughout the phase. The initial values of the second group of registers are used to modify the pre-output (or perhaps even the initial) values of the first group of registers (from the prior iteration) to allow the mixing function (in this case $M_2$) to more directly depend on information tied to the index n. The output of the mixing function $M_2$ on line 15c is supplied to masking function $B_2$, which receives these pre-output values as well as a next set of values from table S via line 19. The masking function $B_2$ uses the set of values from table S to "mask" the pre-output register values from the corresponding mixing function to generate a data string of pseudorandom bits $y_2$.

The iterations continue in this fashion. The particular data strings output from each iteration are concatenated to grow the output data stream. The table S is formatted to be of a sufficient size so that one pass through the S-table values corresponds to the sixty-four (64) iterations. As noted above, this cycle is a "phase." In the event that a phase does not produce a long enough output stream, a new phase is begin by a new call to the Initialize process 12 with "1" having been incremented by 1. That process then uses new R-values and begins the cycle again to create new initial values for the registers (A, B, C, D, $n_1$, $n_2$, $n_3$, $n_4$). The iterations of the phase are then begun again. The overall process is stopped when the length of the output stream reaches a desired value.

Still further details of preferred techniques for implementing the pseudorandom function are described in Ser. No. 08/163,054, filed Dec. 6, 1993, the disclosure of which application is hereby incorporated by reference, now U.S. Pat. No. 5,454,039.

Figure 5:
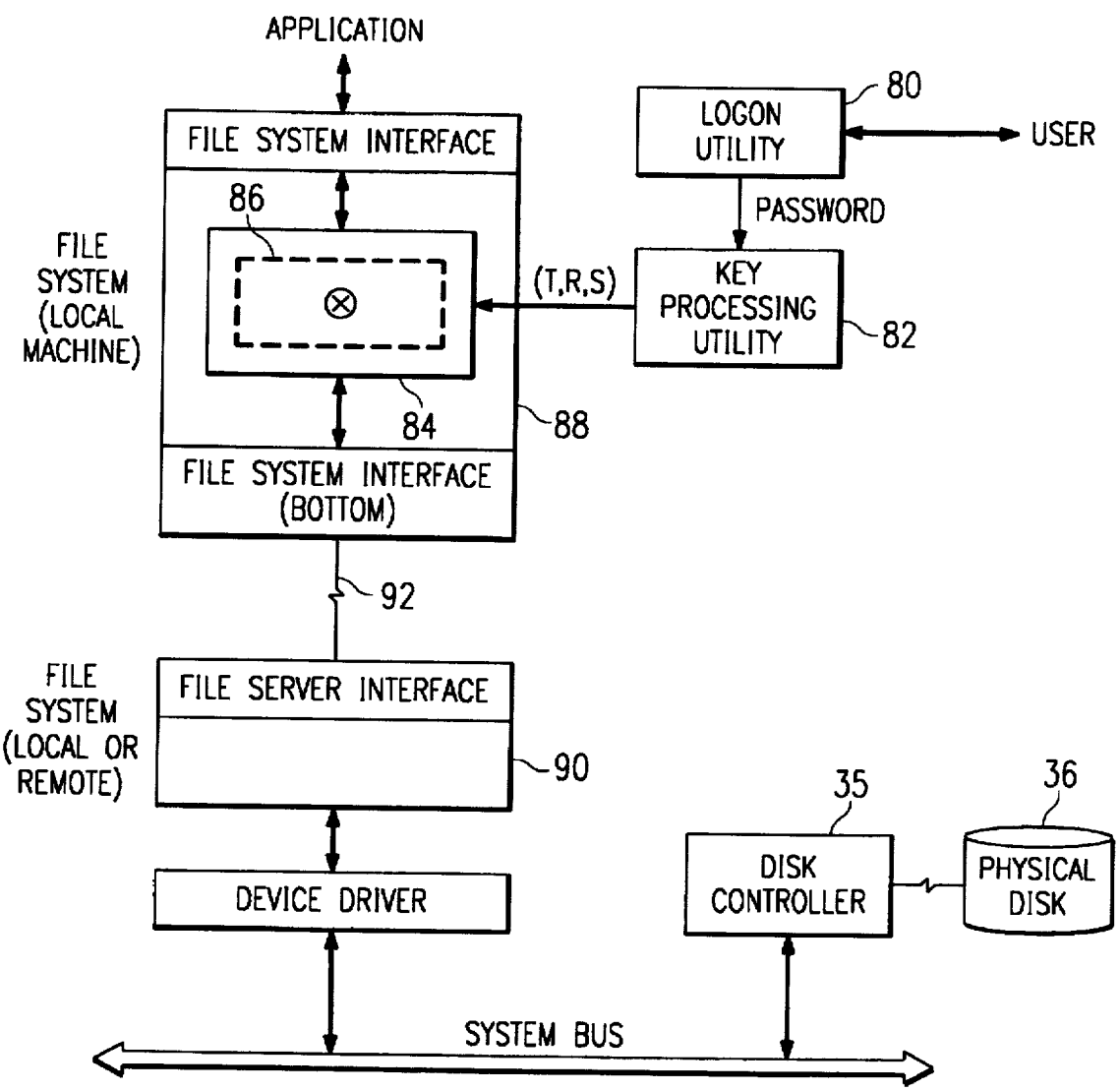
FIG. 5 illustrates a portion of the computer of FIG. 1 showing a length-increasing pseudorandom function supported in the device driver to facilitate file encryption.

It should be appreciated by those skilled in the art that the specific embodiments disclosed above may be readily used as a basis for modifying or designing other routines for carrying out the same purposes of the present invention. One such example is file encryption, as shown in FIG. 5, which illustrates a portion of the computer of FIG. 2 showing the pseudorandom function supported in the file system to facilitate both local and remote file encryption. In this application, the index i is a file number (e.g., an "i-node" number on many UNIX file systems) and the pseudorandom function produces as many bits as the file is long. In this representative example, the files desired to be accessed by the application may reside in the local file system 88 or a remote file system 90 accessible to the local file system 88 via the communication link 92. As in FIG. 3, the login utility 80 collects the user's name and password and passes these to the key processing utility 82, which generates the tables T, R and S. These tables are supplied to the pseudorandom function 84, which generates the pseudorandom bit strings that are used by the encryption function 86 to encrypt the data files.

Encryption may be performed after file compression, with decryption being done before file compression. Thus, to write a file, the technique compresses the file and then encrypts; to read a file, the technique decrypts and then decompresses. If desired, the (possibly) compressed file might be broken into fixed length blocks and the index to the pseudorandom function would specify both the file ID and the block number. The file systems include appropriate interface layers to communicate the read and write requests.

Those skilled in the art will recognize that such equivalent techniques and embodiments do not depart from the spirit and scope of the invention as set forth in the appended claims.

What is claimed is:

1. A method, using a secret key, to protect information in a storage device of a computer, the secret key being derived from a password entered into the computer by an authorized user, comprising the steps of:

applying a length-increasing pseudorandom function to the secret key and an index to generate a pseudorandom bit string having a length that is equal to a portion of the storage device associated with the index; and using the pseudorandom bit string to encrypt and decrypt data accesses to and from the portion of the storage device.

2. The method as described in claim 1 wherein the storage device is a hard disk and the portion is a sector of the hard disk.

3. The method as described in claim 1 wherein the secret key is stored in a volatile memory of the computer and vanishes under one or more predetermined conditions.

4. The method as described in claim 3 wherein the predetermined conditions include the authorized user turning off the computer, the authorized user logging off from the computer, the authorized user locking the computer, or expiration of a predetermined time period during which the computer is not used by the authorized user.

5. The method as described in claim 1 wherein the step of applying the length-increasing pseudorandom function to the secret key includes the step of transforming the secret key into one or more tables of pseudorandom numbers to facilitate generation of the pseudorandom bit string given the index.

6. A method, using a secret key, to protect information in a storage disk Of a computer, the secret key being derived from a password entered into the computer by an authorized user, comprising the steps of:

applying a length-increasing pseudorandom function to the secret key and an index to generate a pseudorandom bit string having a length equal to a sector of the storage disk associated with the index;

combining a data block of the information with the pseudorandom bit string to generate a ciphertext; and storing the ciphertext in the sector to protect the data block against unauthorized disclosure.

7. The method as described in claim 6 further including the step of using the pseudorandom function to encrypt and decrypt other storage device accesses while the authorized user is logged onto the computer.

8. The method as described in claim 7 wherein the other storage device accesses are performed by evaluating the pseudorandom function at one or more sector indexes.

9. A method to protect information on a storage device of a computer, comprising the steps of:

deriving a secret key from a password entered into the computer by an authorized user;

applying a length-increasing pseudorandom function to the secret key and an index to generate a pseudorandom bit string having a length equal to a sector of the storage device associated with the index;

encrypting a data block of the information with the pseudorandom bit string to generate a ciphertext; and storing the ciphertext in the sector to protect the data block against unauthorized disclosure.

10. The method to protect information as described in claim 9 further including the step of:

retrieving the ciphertext stored at the physical location in response to a read request; and decrypting the ciphertext with the pseudorandom bit string to derive the data block.

11. The method as described in claim 9 wherein the secret key is derived from the password and other information stored in the computer.

12. The method as described in claim 11 wherein the other information includes a unique identifier for the computer.

13. The method as described in claim 9 wherein a slow-to-compute function is applied to the password prior to deriving the secret key.

14. A computer, comprising:

a storage device;

means for processing a password entered by an authorized user to generate a secret key;

means for using the secret key and an index to generate a pseudorandom bit string having a predetermined length; and means for encrypting and decrypting data accesses to and from the storage device using the pseudorandom bit string.

15. The computer as described in claim 14 wherein the index is a file number identifying a file associated with the location in the storage device, and wherein the predetermined length of the pseudorandom bit string is made equal to the length of the file.

16. The computer as described in claim 15 further including means for compressing and decompressing the file, such that the file is compressed prior to encryption and decompressed following decryption.

17. A method, using a secret key, to protect information on a computer having a disk, comprising the steps of:

deriving a user key from a password entered into the computer from an authorized user;

encrypting the secret key with the user key to generate a value that is stored along with information identifying the authorized user;

recovering the secret key in response to subsequent entry of the password by the authorized user;

applying a length-increasing pseudorandom function to the secret key and an index to generate a pseudorandom bit string having a length equal to a sector of the disk associated with the index; and using the pseudorandom bit string to encrypt and decrypt data accesses to and from the sector.

18. The method as described in claim 17 further including the step of replacing the value with a second value associated with a second password of the authorized user.

19. A method, using a secret key shared by a plurality of authorized users, to protect information on a computer having a disk, comprising the steps of:

for each authorized user of the computer, deriving a user key from the authorized user's password and encrypting the secret key with the user key to generate a value that is then stored along with an identifier for the user;

recovering the secret key in response to subsequent entry of a password from one of the authorized users;

applying a length-increasing pseudorandom function to the secret key and an index to generate a pseudorandom bit string having a length equal to a sector of the disk associated with the index; and using the pseudorandom bit string to encrypt and decrypt data accesses to and from the sector.

20. An article of manufacture, comprising:

a computer-readable storage medium having a substrate; and computer program data encoded in the substrate of the computer-readable storage medium, wherein the computer program data comprises:

means for applying a length-increasing pseudorandom function to a secret key and an index to generate a pseudorandom bit string having a length equal to a sector of the storage disk associated with the index; and means for using the pseudorandom bit string to encrypt data accesses to the sector of the storage disk and to decrypt data accesses from the sector of the storage disk.

* * * * *

UNITED STATES PATENT AND TRADEMARK OFFICE
CERTIFICATE OF CORRECTION

PATENT NO : 5,677,952
DATED : Oct. 14, 1997
INVENTOR(S): Blakley, III et al

It is certified that error appears in the above-identified patent and that said Letters Patent is hereby corrected as shown below:

Column 8, line 51, please delete "$0 \leqq i < 2^{32}$" and insert --$0 \leq i < 2^{32}$--;
  8, line 60, please delete "$0 \leqq$" and insert --$0 \leq$--;
  8, line 61, please delete "$0 \leqq$" and insert --$0 \leq$--;
  8, line 62, please delete "$0 \leqq$" and insert --$0 \leq$--;

Signed and Sealed this

Eleventh Day of May, 1999

*Attest:*

Q. TODD DICKINSON

*Attesting Officer*          *Acting Commissioner of Patents and Trademarks*